United States Patent [19]

Kochhar et al.

[11] 3,859,231

[45] Jan. 7, 1975

[54] SIMPLIFIED PROCESS FOR MANUFACTURE OF CATALYST COMPONENT

[75] Inventors: Rajindar K. Kochhar; Myron D. Osborn, both of Overland Park; Robert J. Rowatt, Lake Quivira, all of Kans.

[73] Assignee: Gulf Research & Development Company, Pittsburgh, Pa.

[22] Filed: Oct. 13, 1972

[21] Appl. No.: 297,536

[52] U.S. Cl. ........ 252/429 R, 252/429 B, 260/93.7, 260/94.9 CD, 260/94.9 E
[51] Int. Cl. ............................................. B01j 11/84
[58] Field of Search .................... 252/429 B, 429 R

[56] References Cited

UNITED STATES PATENTS

| | | | |
|---|---|---|---|
| 3,163,611 | 12/1964 | Andersen et al. | 252/429 B |
| 3,642,746 | 2/1972 | Kashiwa et al. | 252/429 B X |
| 3,694,421 | 9/1972 | Vetter | 252/429 B X |

Primary Examiner—Patrick P. Garvin

[57] ABSTRACT

This invention is an improved procedure for preparing a titanium halide-magnesium halide component of a Ziegler type catalyst. In the improved method a solution of titanium tetrachloride in an inert hydrocarbon solvent is mixed with magnesium chloride (or hydroxychloride) and an alcohol, with the provision that the titanium chloride solution is not mixed with the alcohol before contacting the magnesium chloride.

10 Claims, No Drawings

SIMPLIFIED PROCESS FOR MANUFACTURE OF CATALYST COMPONENT

DESCRIPTION OF THE INVENTION

In the method of this invention $TiCl_4$ is precipitated on the surface of a carrier from hydrocarbon solutions. The resulting precipitate may be used wet or dry along with an organoaluminum compound to polymerize $C_2 - C_{10}$ 1-olefins.

Reactions of transition metal halides with carriers such as $MgCl_2$, $MgCO_3$, $Mg(OH)Cl$, $Mg(OOCCH_3)_2$, $SiO_2$ and others containing a limited amount of —OH or other reactive groups have been employed in the past to prepare Ziegler type catalyst components. In the prior art procedures the ingredients are refluxed or heated together in the presence or absence of solvent, under inert conditions, for a sufficient length of time so as to deposit a fair amount of the active transition metal compound on the surface of the carrier. It is assumed that the transition metal halide reacts with substituents such as -OH groups on the carrier to give a chemically bound composition that cannot be washed away with solvents, in accordance with the equation:

$$TiCl_4 + HO-MgCl \rightarrow TiCl_3-O-MgCl$$

This new species then forms the basis of an active catalyst for olefin polymerizations. However, the presence of moisture or large amounts of —OH or other polar groups destroys the activity of the catalyst.

In view of the dearth of active substituent groups in some of the solid supports, various treatments of the carrier prior to its reaction with the transition metal compound have been suggested in published literature. According to one such modification the support is ball-milled to reduce its particle size. In another one the same effect is achieved by flash-evaporating at high temperature a solution of the carrier in lower alcohols. Others teach the sintering of the carrier with or without steam treatment. Pretreatment of the carrier with electron donors and removal of the excess of the same by post-treatment at high temperature and under vacuum has been suggested in some other publications (U.S. Pat. Nos. 3,642,746 and 3,647,772). However all prior methods suffer from the disadvantage that the catalyst preparation requires a prolonged and complicated procedure. In order to overcome the basic inactivity of the material, the carrier is usually treated with the transition metal compound at high temperatures. Furthermore, excess transition metal halide must be removed by filtration and the support must then be thoroughly washed to remove undesirable by-products of the reaction that are known to deleteriously affect the catalyst efficiency. In view of the corrosive nature of the ingredients and the decomposition of the catalyst by air or oxygen, the reaction must be carried out in glass-lined equipment and under inert conditions. These considerations along with the fact that the transition metal compound must always be present in excess to push the reaction to completion, add to the difficulty and cost of carrying out the process.

Use of alcohols in the Ziegler type polymerization process is well known. They have been employed to regulate both the molecular weight and the molecular weight distribution of the product, to keep the reactor system clean, to avoid oily products in polyethylene and to improve the extruding and blowing characteristics of polyethylene. The alcohols are customarily employed in very small amounts. In spite of this they invariably reduce polymer yield and if present in larger amounts, completely stop the reaction. These difficulties have been avoided in the process of the present invention.

According to the present invention, the reaction of transition metal halide with the solid support and an alcohol or mixture of alcohols is accomplished in a single step by a wet or a dry procedure. According to the wet process the ingredients, namely, the transition metal halide, magnesium chloride (or hydroxychloride) and the alcohol are mixed together in an inert hydrocarbon solvent to form the desired catalyst component immediately prior to the addition of the organoaluminum compound. The catalyst is then prepared by mixing the two components together and is added to the polymerization reactor without aging or other treatment.

According to the dry process the three ingredients, namely, the transition metal halide, the carrier and the alcohol are stirred together in an inert hydrocarbon solvent and the solvent is removed under vacuum by application of mild heat. The dry catalyst component may then be stored under inert conditions for later use along with an organoaluminum compound as the cocatalyst.

The order of mixing the ingredients greatly influences the activity of the catalyst. The alcohol may be mixed with $MgCl_2$ prior to the addition of $TiCl_4$, or $MgCl_2$ and $TiCl_4$ may be combined together before putting in the alcohol, to lead to a successful reaction. The mixing may be done without an inert diluent, but the latter greatly facilitates the reaction. The catalyst component may then be used without further treatment or may be dried and stored.

However, where $TiCl_4$ is mixed with alcohol prior to the addition of $MgCl_2$, a catalytically inert product is formed. It is considered probable that the alcohol forms an insoluble complex with $TiCl_4$ which is incapable of further reaction with $MgCl_2$, although the chemistry of this reaction is not well understood. Most probably the alcohol reacts with the transition metal halide to generate a fine precipitate of an alkoxy halide of variable composition and containing one or more molecules of alcohol of solvation, as in the following reaction of titanium tetrachloride with ethanol:

$$TiCl_4 + C_2H_5OH \rightarrow TiCl_x(OC_2H_5)_{4-x} \cdot yC_2H_5OH$$

The compound formed by this known reaction is not an active catalyst component either by itself or in the presence of post-added $MgCl_2$.

The necessary presence of $MgCl_2$ during the precipitation step of the present process is believed to indicate that it takes part in the reaction itself, giving a final catalyst containing chemically bound magnesium, titanium, alkoxy groups and alcohol. Apparently the concentration of each ingredient is interrelated to the proportionate concentrations of the other two. Furthermore all three ingredients are essential for a successful reaction. If either the alcohol or $MgCl_2$— alcohol combination are missing, a normal Ziegler catalyst with moderate activity is obtained. However if $MgCl_2$ alone is missing, the activity of the catalyst is completely lost. The magnesium compound may be present to the extent of from 0.05 to 20 moles per mole and preferably 0.2 to 10 moles per mole of the transition metal halide. The relationship of alcohol to the other ingredients is more complex and its concentration depends upon the combined presence of $TiCl_4$ and $MgCl_2$ and the nature of the process. The dry process in which excess ingredients are removed by filtration and evaporation prior to the addition of the organoaluminum compound can naturally tolerate higher amounts of the alcohol during the catalyst preparation step. In the wet process, however, excess alcohol is likely to deleteriously affect both the transition metal halide and the alkylaluminum compound. However, a certain minimum amount of alcohol is necessary for a successful reaction. Bearing these limitations in mind the alcohol concentration may be varied between 0.05 and 20 moles or preferably 0.1 – 10 moles per total moles of both the magnesium compound and the transition metal halide.

The magnesium compound may be added in powdered form either pure or mixed with a powdered solid diluent, or more conveniently as a concentrated solution in alcohol, provided the latter is present within the above-mentioned limits. Liquid $C_1 - C_{10}$ alcohols or mixtures thereof, or homogeneous solutions of alcohols in hydrocarbon solvents may be used. The addition is preferably carried out at a temperature between 15° – 60°C.

In order to check the hypothesis that the transition metal compound is not present in the finished catalyst component in a soluble form, 4.0 g each of anhydrous magnesium chloride (powder) and titanium chloride were stirred together for 5 minutes in 100 ml heptane and then mixed with 16.0 g ethanol. The mixture was agitated intermittantly between withdrawing the aliquot of heptane layer at regular intervals for Ti and Cl analysis. The results are reported in Table 1.

TABLE 1

| Aliquot No. | Time elapsed after mixing | % Ti | % Cl | Remarks |
|---|---|---|---|---|
| 1 | 0 | 1.011 | 2.989 | Nominal[a] |
| 2 | 10 min | 0.048 | .129 | |
| 3 | 30 min | 0.037 | .085 | |
| 4 | 2 hrs | 0.027 | .052 | |
| 5 | 24 hrs | 0.019 | .037 | |

[a]Calculated on the basis of added titanium compounds

It is clear that the reaction is essentially complete within ten minutes of mixing the ingredients and a new insoluble compound is generated during the process.

An unexpected advantage of the process is an improvement in the physical properties of the polymer obtained by use of the catalyst component. It was discovered, for instance, that the bulk density of the polymer powder prepared by use of the catalyst component of the present invention is higher by a factor of 2 to 4 as compared to a polymer prepared by utilizing catalyst components made by prior art methods. High bulk density is particularly important in the manufacturing, processing and storage of the polymer, where it results in more economical usage of existing facilities.

Operation of the process is illustrated by the following specific examples.

EXAMPLE 1

This example describes the application of the dry technique in the presence of an active catalyst employing approximately equal weights of $MgCl_2$, $TiCl_4$ and ethanol.

4.0 g anhydrous magnesium chloride was weighed into a 200 ml flask and mixed with 100 ml anhydrous n-heptane and 2.30 ml $TiCl_4$. To the stirred mixture was then added 5.06 ml of absolute ethanol over a 2 to 3 min. period. The mixture was further agitated for three hours under a dry argon atmosphere. The heptane was siphoned off and the precipitate washed with 25 ml of fresh n-heptane. The solids were dried under vacuum in a rotary evaporator at 40°– 50°C for a period of 1 hour. The dry catalyst on analysis was found to contain 8.16% Ti, 7.6% Mg and 44.3% Cl.

0.1 g of the dry powder was mixed with heptane and charged into a 1500 ml polymerization reactor along with 2.0 ml of a 25% solution of $Et_3Al$ in n-hexane. A total of 1 liter of heptane was employed in the polymerization reactor. The mixture was aged for 20 min. at room temperature and then was heated to 75°C. Ethylene gas was introduced into the stirred reactor at 40 psig. After one hour the reaction was stopped by venting off the gases to obtain a granular powder that weighed 225 g on drying. This is equivalent to a productivity of 27,540 g polyethylene/g Ti/hr at 40 psig. The powder had a bulk density of 0.34 g/ml.

EXAMPLES 2, 3, 4, 5, 6

In these examples quantities of the ingredients were varied in preparing a dry catalyst. Example 5 utilized n-propanol instead of ethanol as the alcohol. Catalyst preparations and polymerization reactions were conducted according to the procedure outlined in Example 1. Experimental data and results are reported in Table 2.

TABLE 2

| Ex. No. | Ingredients, grams | | | | Analysis, % | | | Productivity g PE/g Ti/hr | Bulk Polymer Density g/ml |
|---|---|---|---|---|---|---|---|---|---|
| | TiCl | MgCl$_2$ | Ethanol | Propanol | Ti | Mg | Cl | | |
| 2 | 2 | 6 | 4 | — | 4.16 | 10.36 | 46.5 | 80,530 | .39 |
| 3 | 1 | 7 | 4 | — | 2.31 | 13.31 | 48.9 | 49,780 | .29 |
| 4 | 2 | 6 | 1 | — | 4.61 | 19.09 | 64.9 | 4,600 | .23 |
| 5 | 3 | 3 | — | 3 | 9.63 | 8.64 | 40.0 | 5,100 | .20 |
| 6 | 4 | 4 | 16 | — | 5.46 | 5.92 | 26.9 | 25,100 | .29 |

COMPARATIVE EXAMPLES 6A & B

These examples were carried out according to the procedure described in Example 1, except that one of the ingredients, namely, $MgCl_2$ or alcohol was omitted. The two catalysts obtained showed poor reactivity toward ethylene. Pertinent data are given in Table 3.

TABLE 3

| Ex. No. | Ingredients, grams | | | Analysis % | | | Productivity g PE/g Ti/hr |
|---|---|---|---|---|---|---|---|
| | TiCl$_4$ | MgCl$_2$ | Ethanol | Ti | Mg | Cl | |
| 6A | 8 | 0 | 4 | 16.37 | .07 | 22.7 | <25 |
| 6B | 1 | 8 | 0 | 0.46 | 18.73 | 71.4 | 0 |

EXAMPLES 7 – 10

The order of addition of the catalyst ingredients was modified to mix the alcohol with MgCl$_2$ prior to the addition of TiCl$_4$. The catalyst was then dried according to the procedure described in Example 1. Pertinent catalyst and polymerization data are given in Table 4.

EXAMPLES 11 – 18

The wet process of catalyst preparation was employed in Examples 11 – 18. In these examples anhydrous MgCl$_2$ was mixed with the alcohol in heptane before the addition of titanium tetrachloride. The whole mixture was then transferred to the polymerization reactor after 7 minutes, along with the solvent and 2.0 ml of triethylaluminum solution. The polymerization reaction was conducted in accordance with the procedure described in Example 1. Pertinent data are recorded in Table 5.

TABLE 4

| Ex. No. | Ingredients, grams | | | Analysis, % | | | Productivity g PE/g Ti/hr | Bulk Density | Alcohol employed |
|---|---|---|---|---|---|---|---|---|---|
| | TiCl$_4$ | MgCl$_2$ | Alcohol | Ti | Mg | Cl | | | |
| 7 | 3 | 3 | 3 | 10.8 | 9.70 | 42.4 | 4,860 | 0.20 | Methanol |
| 8 | 3 | 3 | 3 | 9.28 | 10.82 | 41.9 | 21,550 | 0.30 | Ethanol |
| 9 | 3 | 3 | 3 | 9.52 | 5.46 | 41.2 | 7,350 | 0.23 | Propanol |
| 10 | 4 | 4 | 16 | 6.31 | 5.45 | 26.4 | 18,400 | 0.27 | Ethanol |

TABLE 5

| Ex. No. | Alcohol | Ingredients, grams | | | Productivity g PE/g Ti/hr | $\eta$inh$^a$ | Bulk Density g/ml |
|---|---|---|---|---|---|---|---|
| | | alcohol | MgCl$_2$ | TiCl$_4$ | | | |
| 11 | Methanol | .05 | .1 | .05 | 20,140 | — | .35 |
| 12 | Methanol | .10 | .1 | .10 | 13,376 | — | .33 |
| 13 | Methanol | .10 | .1 | .20 | 5,453 | — | .30 |
| 14 | Methanol | .20 | .1 | .1 | 9,120 | 9.58 | .18 |
| 15 | Ethanol | .05 | .1 | .1 | 8,000 | 7.98 | .27 |
| 16 | Ethanol | .1 | .1 | .1 | 8,000 | 7.63 | .29 |
| 17 | Isopropanol | .1 | .1 | .1 | 7,300 | 7.42 | .20 |
| 18 | butanol | .1 | .1 | .1 | 12,600 | 8.46 | .32 |

$^a$Measured as 0.05% solution in decalin at 135°C.

EXAMPLES 18 – 20

In another variation of the wet process, 3.0 g anhydrous MgCl$_2$ was ball-milled with 27.0 g microtalc for three days. The reaction was conducted according to the scheme given in Example 11–18 with 0.1 g of the milled solid support and methanol as the alcohol. Catalyst preparation and ethylene polymerization data are reported in Table 6

TABLE 6

| Ex. No. | Ingredients, grams | | | Productivity g PE/g Ti/hr | Bulk Density g/ml |
|---|---|---|---|---|---|
| | Carrier$^a$ | CH$_3$OH | TiCl$_4$ | | |
| 19 | 0.1 | 0.02 | .025 | 7,900 | 0.16 |
| 20 | 0.1 | 0.04 | .025 | 10,200 | 0.26 |
| 21 | 0.1 | 0.08 | .025 | 20,000 | 0.25 |

$^a$3.0 g MgCl$_2$ and 27.0 g microtalc, (MP 12-50, Pfizer), ball-milled for 3 days.

COMPARATIVE EXAMPLES 11A – 19A

Reaction was carried out according to Examples 11 and 19 except that the addition of alcohol was omitted. 0.1 g MgCl$_2$ with 0.1 g TiCl$_4$ (11A) produced 17.0 g polyethylene in one hour with a bulk density of 0.09 g/ml while 0.1 g of MgCl$_2$ + microtalc with 0.025 g TiCl$_4$ (18A) produced a total of only 3.0 g polyethylene in one hour.

EXAMPLES 22 – 28

These examples depict the use of alcoholic solutions of MgCl$_2$ in the wet process. The catalyst was prepared by mixing a calculated volume of an alcoholic solution of MgCl$_2$ with TiCl$_4$ in 50 ml n-heptane. The slurry was then charged to the reactor along with 2.0 ml of a 25% solution of triethylaluminum and 1 liter of n-heptane. Polymerizations were conducted according to the procedure described in Example 1. Pertinent data are given in Table 7.

TABLE 7

| Ex. No. | Alcohol | Solution Added ml. | MgCl$_2$ g. | TiCl$_4$ g. | Productivity g PE/g Ti/hr | $\eta$inh$^a$ | Bulk Density g/ml |
|---|---|---|---|---|---|---|---|
| 22 | propanol | .20 | .01 | .10 | 10,450 | 9.74 | 0.32 |
| 23 | Propanol | .20 | .01 | .05 | 22,000 | 7.45 | 0.27 |
| 24 | Propanol | .20 | .01 | .025 | 17,500 | 6.72 | 0.14 |
| 25 | Methanol + Isopropanol | .20 | .01 | .05 | 7,750 | 9.38 | 0.14 |
| 26 | Butanol | .25 | .01 | .10 | 9,120 | 8.74 | 0.28 |
| 27 | Butanol | .25 | .01 | .05 | 16,000 | 10.74 | 0.17 |
| 28 | Butanol | .25 | .01 | .02 | 6,270 | 12.66 | 0.10 |

$^a$Measured as 0.05% solution in decalin at 135°C.

COMPARATIVE EXAMPLE 26A

An experiment was run according to Examples 26 – 28 employing 0.25 ml n-butanol without $MgCl_2$. No polymer was obtained after 1 hour of reaction.

EXAMPLES 29 – 34

In some previously published literature, the $MgCl_2$ or other carrier is first reacted with $TiCl_4$ at ambient or elevated temperature. Sometimes the product is washed free of excess $TiCl_4$. It is assumed that a chemical combination between $TiCl_4$ and the carrier takes place during this treatment and the new compound makes a highly active catalyst for ethylene polymerization. In order to test this hypothesis and clarify the role played by the carrier, the addition of catalyst ingredients to the reactor was reversed, that is, $TiCl_4$ and $Et_3Al$ were first aged together for 20 min. in heptane solution and then mixed with an alcoholic solution of $MgCl_2$.

The $TiCl_4$ heptane solution was aged for 20 minutes at room temperature with 2.0 ml of a 25% solution of $Et_3Al$ and was then charged to a 1.5 liter polymerization reactor. Alcoholic $MgCl_2$ was then added and the polymerization was conducted according to the method of Example 1. Results are shown below in Table 8.

TABLE 8

| Ex. No. | Alcohol | Solution Added ml. | $MgCl_2$ g. | $TiCl_4$ g. | Productivity g PE/g Ti/hr | Bulk Density g/ml |
|---|---|---|---|---|---|---|
| 29 | n-Propanol | .20 | .01 | .10 | 6,500 | 0.15 |
| 30 | n-Propanol | .20 | .01 | .05 | 11,800 | 0.17 |
| 31 | n-Propanol | .20 | .01 | .02 | 30,500 | 0.14 |
| 32 | n-Butanol | .25 | .01 | .10 | 4,100 | 0.12 |
| 33 | n-Butanol | .25 | .01 | .05 | 23,800 | 0.13 |
| 34 | n-Butanol | .25 | .01 | .02 | 10,600 | 0.13 |

These results reveal that when the titanium halide is reacted with $MgCl_2$ in the presence of alcohol, desirable catalysts may be formed even though the organoaluminum compound has previously been added to the titanium chloride. The presence or absence of the organoaluminum compound is therefore not a critical factor in the operability of the process of the present invention.

COMPARATIVE EXAMPLE 34A

This experiment was carried out by utilizing a standard Ziegler catalyst of $TiCl_4$ + $Et_3Al$. No other addition was employed. Further it was observed that a minimum of 0.1 g $TiCl_4$ was required to achieve a successful polymerization in the equipment employed. Reaction was therefore carried out with 0.1 g $TiCl_4$ and 2.0 ml $Et_3$ Al solution according to the procedure outlined in Example 1. The catalyst showed a productivity of 570 g PE/ g Ti/hr. The polymer had a bulk density of 0.05 g/ml.

EXAMPLE 35 and COMPARATIVE EXAMPLE 35A

These two experiments were carried out to check the validity of the hypothesis, that prior mixing of $TiCl_4$ with alcohol in the absence of $MgCl_2$ leads to an inert catalyst. 0.1 g $TiCl_4$, 0.1 g $MgCl_2$ and 0.05 g ethanol were employed in each of the two experiments. In Example 35, $MgCl_2$ and $TiCl_4$ were combined together in 100 ml heptane prior to the addition of the alcohol. In Run No. 35A, $TiCl_4$ and alcohol were mixed before the addition of $MgCl_2$. Polymerizations were conducted as described in Example 1. Catalyst No. 35 gave a productivity figure of 14,800 g PE/g Ti/hr, while No. 35A had a productivity of only 912. The two polymers formed had bulk densities of 0.22 and 0.12 g/ml respectively.

EXAMPLE 36

This example employed magnesium hydroxychloride (prepared by sintering $MgCl_2 \cdot 6H_2O$ at 200°C for 16 hours) as the active carrier. 0.1 g Mg(OH)Cl was mixed with 0.1 ml methanol in 100 ml heptane and then stirred with 0.1 g $TiCl_4$. Then 2 ml of $Et_3Al$ solution was added as the cocatalyst and the polymerization was carried out according to the procedure described in Example 1. The catalyst had a productivity of 6,400 g Pe/ g Ti/hr. The polymer had a bulk density of 0.31 g/ml.

COMPARATIVE EXAMPLE 36A

This example was similar to Example 36 except that the addition of methanol was omitted. The catalyst showed a productivity of 760 g PE/g Ti/hr. The polymer had a bulk density of 0.08 g/ml.

I claim:

1. A process for the manufacture of a polymerization catalyst component which consists essentially of contacting a magnesium compound with titanium tetrachloride in an inert hydrocarbon medium with the further provision that either (a) the magnesium compound is contacted with a 1–10 carbon alkanol in said hydrocarbon medium before the titanium tetrachloride is added to the reaction medium, or (b) the magnesium compound and titanium tetrachloride are reacted together in the hydrocarbon medium and then contacted with a 1–10 carbon alkanol in said hydrocarbon medium after being formed; said contacting steps being carried out at a temperature in the range of 15°–60°C.; said magnesium compound being selected from the group consisting of magnesium chloride and magnesium hydroxychloride; the magnesium compound being employed in a ratio of 0.05 to 20 mols per mol of titanium tetrachloride; and the alkanol being employed in a ratio of 0.05 to 20 mols per mol of titanium tetrachloride plus the magnesium compound.

2. The process of claim 1 in which the magnesium compound and titanium tetrachloride are reacted together in the hydrocarbon medium and then contacted with a 1–10 carbon alkanol in said hydrocarbon medium.

3. The improvement according to claim 1 in which the alcohol is methanol.

4. The improvement according to claim 1 in which the alcohol is ethanol.

5. The improvement according to claim 1 in which the alcohol is propanol.

6. The improvement according to claim 1 in which the alcohol is butanol.

7. The improvement according to claim 1 in which the magnesium chloride is used in the form of a mixture with a powdered solid diluent.

8. The improvement according to claim 7 in which the powdered solid diluent is talc.

9. The improvement in the manufacture of a polymerization catalyst component according to claim 1 consisting of dissolving 1 part by weight of $TiCl_4$ in an inert hydrocarbon solvent and reacting the resulting solution with a mixture consisting of approximately three parts by weight of $MgCl_2$ and two parts by weight ethanol.

10. The improvement in the manufacture of a polymerization catalyst component consisting of mixing together approximately equal weights of $TiCl_4$ and $MgCl_2$ in an inert hydrocarbon solvent, then adding and reacting therewith an amount of ethanol approximately equal in weight to either of the other reagents and recovering a dry solid product from the resulting reaction product mixture.

* * * * *